Figure 1:
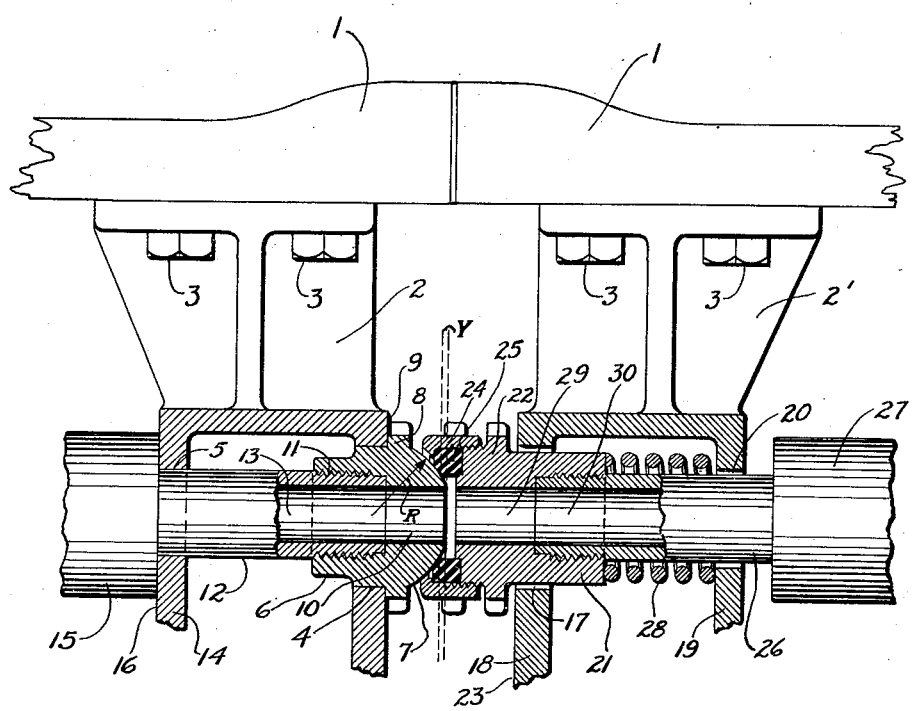

June 14, 1932.  E. A. LARSSON  1,863,017
COUPLING DEVICE
Filed May 29, 1930

WITNESS:
H. J. Stromberger

Inventor
ERNST A. LARSSON
By
Attorney

Patented June 14, 1932

1,863,017

UNITED STATES PATENT OFFICE

ERNST A. LARSSON, OF MANSFIELD, OHIO, ASSIGNOR TO THE OHIO BRASS COMPANY, OF MANSFIELD, OHIO, A CORPORATION OF NEW JERSEY

COUPLING DEVICE

Application filed May 29, 1930. Serial No. 456,972.

My invention relates to coupling devices for use on cars and particularly for coupling fluid pressures such as air and steam.

The object of my invention is to provide couplings which may be mounted underneath rigidly connected car couplers and will permit of such slight movement in the couplers as is impractical to avoid without excessive expense.

In automatically coupling the air and steam lines it is advantageous to have such coupling devices as required mounted in combination with the car couplers which in turn couple automatically and rigidly, but it is quite impossible to prevent some slight movement of the car couplers relative to each other which means that there will be some movement between the coupling devices for the steam and air and this movement will be increased as the distance of the coupling device from the car coupler increases.

In order to accomplish the automatic coupling referred to, I prefer to use a construction which is new and novel and my invention resides in the combination, relation and construction of the various parts hereinafter described and shown in the accompanying drawing.

In the drawing the figure represents a side view in partial section of my invention showing a coupling device for a single train line which may be for either air or steam.

As shown in the drawing, I employ two couplers 1 which may be of the Janny type or of the Millerhook type or other improved type in which the coupler heads are brought into face to face contact and held rigidly as disclosed in U. S. Letters Patent 1,660,733 issued to C. H. Tomlinson February 28th, 1928. These couplers of course are mounted on the car body and underneath are brackets 2 and 2' secured to the car couplers by means of bolts 3. The bracket 2 has an orifice 4 in the front side and an orifice 5 in the rear wall. Mounted in the orifice 4 is a connecting member 6 which has a ball shaped face 7 with a radius R. The member 6 is made preferably of metal and has a shoulder 8 which butts up against the front face 9 of the bracket 2. The member 6 has an orifice 10 therethrough which has a threaded portion 11 to receive a nipple 12 threaded therein and having a passage 13 therethrough and which extends through the opening 5 in the rear wall 14 and when the parts 6 and 12 are in position and the threaded portions drawn up the parts 8 and 15 will be drawn into contact with the front and rear walls of the bracket 2 and the parts will be held firmly in position against rotation or longitudinal movement.

The bracket 2' is provided with an orifice 17 through the front wall 18 and the rear wall 19 is provided with an orifice 20. Mounted in the orifice 17 is a member 21 preferably of metal and having a flange portion 22 which may butt against the front face 23 of the wall 18 and limit the rearward longitudinal movement. The front end of the member 21 has a flanged collar 24 threadably secured thereto and forming a recess to receive a composition disc 25 which is held in position by the flanged member 24 and the front face of the member 21. The member 25 is made of a composition such as a rubber composition or a synthetic resin composition such as bakelite and has a curved face engaging the curved face 7 on the member 6 and conforming thereto so that when in contact with the spherical face of the member 6 any relative movement of the axes of the members 6 and 21 will permit the contacting faces of the members 6 and 25 to move relative to each other.

The member 6 projects within the member 25 an amount which in the drawing is represented by distance $y$ thus permitting the full original contact between the members 6 and 25 during any relative movement thereof. The member 21 has threadably secured thereto a nipple 26 which passes through the orifice 20 and which has an enlargement 27. The members 21 and 26 are longitudinally movable in the bracket 2' and are normally biased to an advanced position by means of a spring 28 thus holding the members 6 and 25 in contact with each other when the devices are in coupled relation and holding the face of the member 27 in contact with the rear face of the wall 19 when the devices are disconnected. The members 21 and 26 have passages 29 and 30 respectively.

The members 15 and 27 may of course be provided with connecting means for either hose or pipe as desired and which means are well known to those skilled in the art.

I provide considerable clearance between the members 21 and 26 and the walls of the orifices 17 and 20 thus permitting alinement of the connecting devices if the car couplers 1 should be somewhat out of alinement.

The brackets 2 and 2′ of course may be fitted with any number of the connecting devices as for instance, a male and female coupling device may be mounted on each bracket and spaced an equal distance on each side of the vertical center line and cross connected and if each bracket is thus equipped a line may be very easily connected and the cars coupled end for end and if a single line is to be coupled and the cars always coupled the same the arrangement may be as shown in the figure with the coupling devices mounted on the vertical center line.

In making a coupling of two cars the car couplers 1 are brought together and automatically locked and simultaneously therewith the fluid coupling devices are brought into coupled relation. The spring held member 21 will yield when the devices contact and will maintain the contact for any slight longitudinal movement of the couplers 1 relative to each other. Also if there is a slight vertical movement of the car couplers 1 relative to each other or a slight unevenness in their vertical height the members 21 and 26 are free to adjust such difference through the space in the orifices 17 and 21. Further, should there be any slight angular variation the axes of the couplers 1 or of the fluid coupling devices themselves such variation will be taken care of due to the spherical contact surfaces.

The member 6 may be made of a molded composition as in the case of the member 25, also the members 6 and 12 may be mounted for longitudinal movement as in the case of the female member of the device and spring held thus permitting both coupling devices to yield longitudinally.

Other modifications will suggest themselves to those skilled in the art, therefore I wish to be limited only by my claims.

I claim:—

1. A connecting device comprising a pair of supports each connected to a car coupler and movable towards each other when a coupling is made, tubular connecting members fixedly secured to one support and one member projecting and having a spherical contact surface, tubular connecting members mounted on the other support and movable longitudinally thereto and one member projecting and having a spherical contact surface conforming to the contact surface on the other said projecting member and to engage the same to form a tight joint, spring means to advance the second projecting member and hold it in contact with the first projecting member and means to limit the advance when the devices are uncoupled, the spherical surface on the one projecting member being of greater extent than that on the other member.

2. A connecting device comprising a pair of rigidly coupled car couplers, a pair of supports secured to the under side of the car couplers and moved towards each other when a coupling is made and held in a fixed spaced relation by the car couplers, tubular connecting members mounted in one support against movement relative thereto and one member projecting and having an exposed spherical contact surface, tubular connecting members mounted on the other support and movable longitudinally thereto and one member projecting and having a spherical contact surface conforming to the contact surface on the other said projecting member and to engage the same to form a tight joint, means biased to move the second projecting member and hold its spherical surface in contact with that of the first projecting member and means permitting transverse movement of the movable member in its support.

3. The combination of a pair of car couplers rigidly connected when coupled, supports secured to the couplers and moved towards each other when a coupling is made and held in a predetermined relation when a coupling is completed, tubular connecting members secured to one support in fixed relation to the one car coupler and one member projecting from the support and having a contact surface, tubular connecting members mounted on the other support and movable longitudinally of one of the car couplers and of the projecting member on the other support and having a surface to engage the contact surface on the projecting member to form an adjustable joint connection and means to maintain said joint after the car couplers are connected.

4. A connecting device comprising a pair of supports each connected to a car coupler and movable towards each other when a coupling is made, tubular connecting members fixedly secured to one support and one member projecting and having a metallic spherical contact surface, tubular connecting members mounted on the other support and movable longitudinally thereto and one member projecting and having a non-metallic seat provided with a spherical contact surface conforming to the spherical contact surface on the other said projecting member and to engage the same to form a tight joint, spring means to advance the second projecting member and hold it in contact with the first projecting member and means to limit the advance when the devices are uncoupled, the spherical surface on the non-metallic seat being of less extent than the metallic spherical contact surface on the other projecting member and the entire non-metallic seating surface arranged to contact with the said metallic contact surface throughout all movements of the projecting members when coupled.

In testimony whereof I affix my signature.

ERNST A. LARSSON.